V. A. FYNN.
ALTERNATING CURRENT MOTOR.
APPLICATION FILED MAR. 6, 1909.

946,505.

Patented Jan. 11, 1910.

WITNESSES:
L. L. Mead.
W. H. Alexander.

INVENTOR
Valère A. Fynn
BY
Fowler & Huffman
ATTORNEYS

UNITED STATES PATENT OFFICE.

VALÈRE ALFRED FYNN, OF LONDON, ENGLAND.

ALTERNATING-CURRENT MOTOR.

946,505.   Specification of Letters Patent.   Patented Jan. 11, 1910.

Original application filed December 21, 1906, Serial No. 348,907. Divided and this application filed March 6, 1909. Serial No. 481,764.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

This application is a division of my prior application, Serial No. 348,907, filed December 21, 1906.

My invention relates to alternate current motors and more particularly to a self-excited, single-phase conduction motor with a shunt characteristic, i. e., to one in which the energy required in the rotor is transmitted to that member mainly by conduction and in which the E. M. F. responsible for the motor field is at least partly generated in the motor itself.

The object of my invention is to improve or control the power factor of the said type of motor.

In other specifications I have disclosed means for achieving this purpose by conductively introducing a compensating E. M. F. into the exciting circuit; according to the present invention I achieve the same purpose by suitably adjusting the phase of that teaser or transformer field by rotation in which the exciting E. M. F. is generated in the rotor conductors of the motor.

Figure 1:
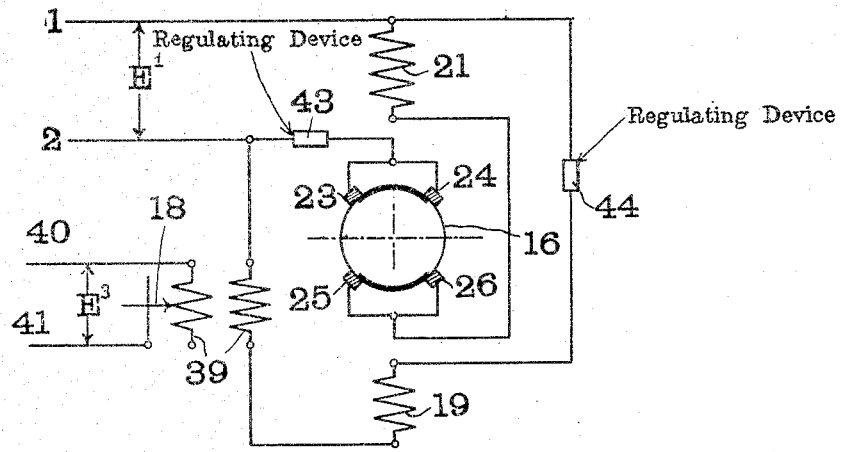
Figure 2:
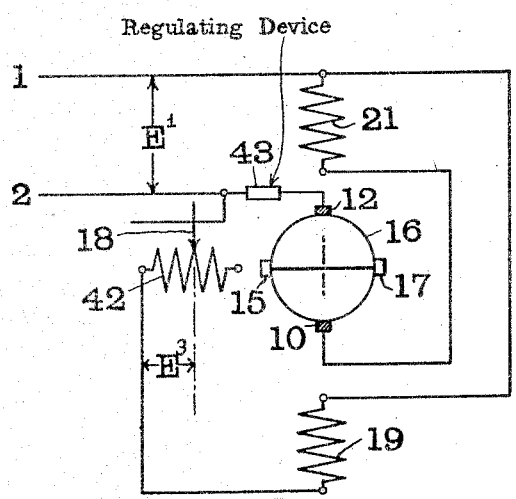

Referring to the drawings, Figure 1 shows diagrammatically the general method by which I vary the phase of the teaser field; Fig. 2 shows how the phase of the teaser field can be varied with the help of an E. M. F. derived from the motor itself.

In Fig. 1 the working circuit comprising the neutralizing winding 21 and the commuted winding 16 is connected to the mains 1, 2 by way of some known and convenient form of regulating device indicated at 43. The rotor ampere turns doing duty as working ampere turns are comprised between the brushes 23, 25 on the one side and 24, 26 on the other. They are neutralized by the stator winding 21 connected in series relation with the working turns on the rotor and in opposition to them. A teaser winding 19 is also disposed on the stator and connected in parallel to the supply. Some regulating device can be inserted in this circuit as indicated at 44 whereby the E. M. F. impressed on 19 from the mains can be regulated. The brushes are so disposed as to short-circuit at least part of the commuted winding 16 along an axis displaced from that of the winding 19. In Fig. 1 the parts of 16 between the brushes 23, 24 on one side and 25, 26 on the other are short-circuited. The exciting E. M. F. for this motor is generated in the rotor itself by rotation of the rotor conductors in the teaser field. The exciting current flows in those parts of 16 which are short-circuited by the brushes. Fig. 1 is one form of the novel motor disclosed in some of my concurrent applications but the present invention is applicable to any form of said motors.

For the purpose of this invention I impress on the teaser winding two E. M. F.'s differing in phase preferably by about 90 degrees and I vary the magnitude of one or of both of these E. M. F.'s thus varying the phase of the teaser flux and consequently also the phase of the resultant E. M. F. in the exciting circuit thereby controlling the power factor of the motor. In Fig. 1 one of the E. M. F.'s impressed on 19 is derived from the mains and has already been referred to. The other is derived from mains 40, 41 by way of the variable ratio transformer 39. The mains 40, 41 can be connected to any desired source generating an E. M. F. differing in phase from that impressed on the mains 1, 2. The magnitude of this auxiliary E. M. F. can be controlled at 18.

The general arrangement of Fig. 2 only differs from the previous in that the brushes are differently disposed in relation to the commuted winding 16. The auxiliary E. M. F. is here also derived from a transformer which can be of the variable ratio type but the latter is embodied in the motor itself. Such a transformer can, of course, be of the two-coil or of the one-coil type. The primary of this transformer is constituted by the exciting winding of the motor shown in Fig. 2, its secondary by the winding 42 disposed on the stator along an axis displaced from that of the neutralizing winding 21 preferably by about 180/n degrees, where "n" stands for the number of poles of the machine.

The motor field due to the current flowing in 16 through the exciting brushes 15 and 17 is of approximately the same phase as that of the E. M. F. impressed on the working brushes 10, 12 and derived from the mains. This motor field, therefore, induces in 42 an E. M. F. the phase of which is practically in quadrature with that derived from the mains 1, 2. This E. M. F. is therefore suitable for my purpose and can be regulated for instance at 18, thus controlling the power factor of the motor.

Having fully described my invention, what I claim as new and desire to secure by Letters Patent of the United States is:

1. In an alternating current motor, the combination with a stationary member provided with a neutralizing winding, of a revolving member carrying a conductively impressed working current along an axis coinciding with that of the neutralizing winding and an exciting current along an axis displaced from that of the neutralizing winding, means for producing a teaser flux along an axis coinciding with that of the neutralizing winding, and means for varying the phase of said teaser flux.

2. In an alternating current motor, the combination with a stationary member provided with a neutralizing winding and a teaser winding, of a revolving member carrying a conductively impressed working current along an axis coinciding with that of the neutralizing winding, and an exciting current along an axis displaced from that of the neutralizing winding, and means for impressing on said teaser winding an E. M. F. differing in phase from that of the supply.

3. In an alternating current motor, the combination with a stationary member provided with a neutralizing winding and a teaser winding, of a revolving member provided with a commuted winding connected in series relation with the neutralizing winding along an axis coinciding with the axis of said neutralizing winding, an exciting circuit on the revolving member, and means for impressing on said teaser winding an E. M. F. differing in phase from that of the supply.

4. In an alternating current motor, the combination with a stationary member provided with a neutralizing winding and a teaser winding, of a revolving member provided with a commuted winding connected in series relation with the neutralizing winding along an axis coinciding with the axis of said neutralizing winding, an exciting circuit on the revolving member, means for impressing on said teaser winding an E. M. F. of approximately the same phase as that of the working E. M. F. and means for impressing on said teaser winding an E. M. F. differing in phase from that of the working E. M. F.

5. In an alternating current motor, the combination with a stationary member provided with a neutralizing winding and a teaser winding, of a revolving member provided with a commuted winding connected in series relation with the neutralizing winding along an axis coinciding with the axis of said neutralizing winding, an exciting circuit on the revolving member, and a variable ratio transformer in circuit with the teaser winding.

6. In an alternating current motor, the combination with a stationary member provided with a neutralizing winding and a teaser winding, of a revolving member provided with a commuted winding connected in series relation with the neutralizing winding along an axis coinciding with the axis of said neutralizing winding, an exciting circuit on the revolving member, an auxiliary winding on the stator disposed along an axis displaced from that of the neutralizing winding and connected in series with said teaser winding.

In witness whereof I have hereunto set my hand and affixed my seal in the presence of two subscribing witnesses.

VALÈRE ALFRED FYNN. [L. S.]

Witnesses:
W. A. ALEXANDER,
E. E. HUFFMAN.